Patented Feb. 16, 1943

2,311,062

UNITED STATES PATENT OFFICE 2,311,062

HALOGEN SUBSTITUTED ACYLAMINO SULPHONIC ACIDS

Henry Martin, Basel, Hans Heinrich Zaeslin, Riehen, near Basel, and Rudolf Hirt, Curt Glatthaar, and Alfred Staub, Basel, Switzerland, assignors to J. R. Geigy A. G., Basel, Switzerland No Drawing. Application June 13, 1939, Serial No. 278,954. In Switzerland June 16, 1938

8 Claims. (Cl. 260—507)

This invention relates to the production of halogen substituted acyl amino sulphonic acids, the products being useful for various purposes in industry e. g. for protecting wool and other substances against damage by moths, the protection being very fast to washing and fulling, and in some cases as disinfecting agents, bactericides, fungicides, and seed steeping materials.

According to the present invention halogen substituted acyl amino sulphonic acids of the aromatic or heterocyclic series are produced by the treatment of carbonic acid derivatives or thio-carbonic acid derivatives, or substances or mixtures of substances forming these compounds which may also contain sulphonic acid groups with isocyclic or heterocyclic amines or aminosulphonic acids containing replaceable hydrogen at the nitrogen atom, the reaction components being so chosen that at least one halogen atom and a sulphonic acid group are present in the final product.

Both substituents may also be introduced by after-treatment, that is by halogenation of the not or not highly halogenated acylamino compounds or by subsequent sulphonation of the not or not sufficiently sulphonated compounds.

As carbonic acid derivatives or thio-carbonic acid derivatives, which may be used for condensation, there are suitable chlorides or esters, amides, imides, or anhydrides of carbonic acid or thio-carbonic acid, whilst under carbonic acid chlorides and thio-carbonic acid chlorides there are understood: carbonylchloride, thio-carbonylchloride, aliphatic, araliphatic, aliphatic-aromatic, aromatic and heterocyclic carbamic acid chlorides, and also aliphatic and aromatic chlorocarbonic acid esters. There have proved particularly valuable halogen and/or alkyl substituted aromatic, aliphatic-aromatic and heterocyclic carbamic acid chlorides, and also halogen and/or alkyl substituted aromatic chlorocarbonic acid esters.

The condensation products in question may, however, also be obtained by the addition of isocyanates, especially of halogen- and/or alkyl-substituted aromatic-isocyanic acid esters, to aromatic or heterocyclic amino sulphonic acids. Similar bodies are formed by the addition of aromatic or heterocyclic carbamic acid-chloride sulphonic acids and isocyanate sulphonic acids respectively to suitable aromatic or heterocyclic amines. Further the addition of saturated or unsaturated aliphatic, araliphatic or aromatic iso-thio-cyanic acid esters, especially halogen substituted oils of mustard, to aromatic and heterocyclic, especially halogen and/or alkyl substituted amino sulphonic acids leads to interesting water-soluble products. But also other methods as for example treatment of carbon disulphide with the specified amino sulphonic acids in the presence of suitable catalysts, for example hydrogen-peroxide or sulphur, leads to water-soluble thio-carbonic acid derivatives. It will be understood that similar products can be obtained by warming, melting or heating, in suitable solvents or suspension media, the amino sulphonic acids with urea or thio-urea or urethanes, with separation of ammonia or alcohol. Furthermore, by sulphonating completely condensed, difficultly soluble or insoluble ureas, thio-ureas and urethanes, containing at least one halogen atom, sulphonic acids with surprisingly good properties can be obtained. Or alkyl- and aryl-carbonic acid azides lead by condensation with amino sulphonic acids, with the development of nitrogen, to urea derivatives.

In all these methods the substitution of the components must be effected in such a manner that at least one halogen-atom and one sulphonic acid group are present in the final product. These may be present in either of the reaction components or even in both at the same time.

The carbamic acid chlorides, chlorocarbonic acid esters, isocyanic acid esters and oils of mustard, used as initial material, can be obtained by the known processes. By treatment of primary or secondary aliphatic, aliphatic-aromatic, aromatic, heterocyclic, araliphatic, araliphatic-aromatic amines, such as aniline, toluidine, 4-chloraniline, 3:4-dichloraniline, 2:5-dichloraniline, 2:4-dichloraniline, 5:8-dichloro-1-naphthylamine, 3-chloro-4-methyl-6-methoxy-aniline, 3-chloro-4-methyl-6-ethoxyaniline, 3:4-dichloro-6-methoxyaniline, 4-nitraniline, ethylaniline, 4-laurylaniline, laurylphenylamine, diphenylamine, 4:4'-dichloro diphenyl ether, 4'-chloro-4-aminodiphenyl-sulphone, 2-amino-2-amino-benzthiazol, 3:4:5-trichloraniline, 2:4:5-trichloraniline, laurylamine, α-dodecylbenzylamine etc., with phosgene a simple reaction produces the carbamic acid chlorides. By suitable conversion known per se the latter, obtained from the corresponding primary amines, can be converted easily into isocyanic acid ester. By the treatment of alcohols, for example dodecyl alcohol or phenols, especially halogen substituted phenols such as 4-chlorophenol, 3:4-dichlorophenol, 3-methyl-4-chlorophenol, 2:4-dichlorophenol and 4-nitrophenol with phosgene in the presence of tertiary bases, there are formed the chlorocarbonic acid esters capable of reaction. On the other hand isothiocyanates can be obtained from amines according to known processes; those which have been obtained by rearrangement from thiocyanic acid esters have proved particularly accessible and valuable. Benzylhalides, nuclear halogenated benzylhalides, and saturated or unsaturated alkylhalides form a suitable initial material.

As aromatic amines there are preferably suitable amino sulphonic acids, for example the sulphonic acids of the aminodiphenyls, aminodiphenylethers, aminodiphenylmethanes, aminodiphenylsulphides, aminodiphenylsulphoxides, aminodiphenylsulphones, aminodiphenylamines, aminodiphenylketones, aminobenzanilides, aminodiphenyl ureas, aminodiphenylthio ureas, also simple sulphonic acids of aniline, naphthylamine, anisidine or nitraniline, are valuable. In this case there are especially suitable halogen and/or alkyl substituted derivatives of the above mentioned amino- or polyamino-sulphonic acids, such as 3:4-dichloraniline-6-sulphonic acid, 4-chloraniline sulphonic acid, 4:4'-dichloro-2-amino-1:1'-diphenylether-2'-sulphonic acid, 4-chloro-4'-amino-1:1'-diphenylether-2'-sulphonic acid, 4:2'-dichloro-4'-amino-1:1'-diphenylether-2-sulphonic acid, 3-methyl-4-chloro-4'-amino-1:1'-diphenylether-2'-sulphonic acid, 3:4-dichloro-4'-amino-1:1'-diphenylsulphide-2'-sulphonic acid, 3:4-dichloro-2'-amino-1:1'-diphenylsulphide-4'-sulphonic acid, 4-chloro-4'-amino-1:1'-diphenylsulphoxide-2'-sulphonic acid, 4-chloro-4'-aminodiphenylsulphone-2'-sulphonic acid, 3:4-di-2-amino-1:1'-diphenylmethane-2'-sulphonic acid, 4-chloro-chloro-4'-aminodiphenylamine-2'-sulphonic acid, 4:4'-dichloro-4'-aminodiphenylketone-3-sulphonic acid, 3'-aminobenzoyl-3:4-dichloranilide-6-sulphonic acid. Of the heterocyclic amino-sulphonic acids may be mentioned the aminobenzthiazolsulphonic acids, aminocarbazolsulphonic acids, aminoacylcarbazolsulphonic acids, aminodiphenylenoxide sulphonic acids, and aminophenothioxinesulphonic acids; in this case also the halogen substitution products have proved particularly valuable.

By a suitable selection of the substitution it is possible to construct products with one or more sulphonic acids. For example by the action of phosgene, thiophosgene or carbondisulphide on halogenated aminodiphenylether-monosulphonic acids, there result ureas or thioureas with two sulphonic acid groups. On the other hand, for example by the action of specified carbamic acid chlorides, especially of halogenated, aliphatic-aromatic and heterocyclic carbamic acid chlorides on aminosulphonic acids, there are formed ureas with one sulphonic acid group. The invention thus concerns symmetrical and unsymmetrical urea sulphonic acids and thiourea sulphonic acids, as well as those which at the nitrogen appear more or less completely alkylated, aralkylated or arylated. By condensation of aminosulphonic acids or alkylaminosulphonic acids with N-primary or secondary carbamic acid chlorides it is possible to produce di-, tri- and tetra-substituted ureas. By conversion of aminosulphonic acids and alkylaminosulphonic acids with nitro-urea or cyanate, there are formed mono- and di-substituted unsymmetrical urea derivatives. The latter can for example be further condensed with acid chlorides, alkyl chlorides, aldehydes or the like. The condition however always remains that after condensation at least one halogen atom and one sulphonic acid group are present in the reaction product.

The same or similar compounds are obtained in the most cases if the condensations are performed with the sulphonic-acid-group-free amines and at the end of the reaction only the solubility of the end products is produced by a succeeding sulphonation. If the solubility of sulphonic-acid groups containing acylamino compounds should still be enhanced, this can likewise be done by subsequent sulphonation.

The use of halogen substituted aminosulphonic acids of the aromatic and heterocyclic series, now, is bound to determined, technically available halogenated compounds which owing to their pure manufacture, that is the separation of isomers or by-products simultaneously formed at the halogenation, are relatively expensive. Further the selection is rather limited by reason of the determined regularities of substitution at the halogenation.

From the iso- or heterocyclic aminosulphonic acids containing exchangeable hydrogen at the nitrogen atom there may be named amongst others halogenated aminodiphenylether-sulphonic acids as particularly convenient. The same are for example obtained by condensation of o- or p-chloronitrobenzene-sulphonic acids with halogen phenols and subsequent reduction.

The production of such halogenated aminodiphenylether-sulphonic acids frequently involves certain difficulties in so far as the manufacture of the halogen phenols used as intermediate products, particularly that of the higher substituted halogen phenols, is not so easy. Thus, one succeeds for example easily in producing pure p-chlorophenol and therefrom condensation products with halogen nitrobenzene-sulphonic acids in pure form. On the contrary it is very difficult to manufacture a sufficiently pure 2:4-dichlorophenol, as the admixtures of p-chlorophenol and 2:6-dichlorophenol always present in the technical product can not be easily separated off on account of the likeness of their boiling points. As the latter compounds also condense with the halogen nitrobenzene-sulphonic acids—and this still easier than the 2:4-dichlorophenol—there result after the reduction in the most cases mixtures of halogenated aminodiphenylether-sulphonic acids in more or less good yield, which are less adapted for smooth condensation with carbonic acid- or thiocarbonic acid derivatives. Although such mixture may be used for many technical purposes, it is preferable to employ more uniform products for other applications.

By usual halogenation of completely formed, not or not highly halogenated acylamino sulphonic acids which are obtained according to the above process from reactive carbonic acid— or thiocarbonic acid-derivatives or such compounds yielding substances or mixtures of substances and isocyclic or heterocyclic amines or aminosulphonic acids having exchangeable hydrogen at the nitrogen atom, one obtains however also easily the corresponding halogenation products which are also well adapted for determined purposes. By this means, there are obtained in part the same acylamino-sulphonic acids as they are obtainable by use of halogenated amines or aminosulphonic acids, in part, however, also substitution products halogenated in other positions. It is particularly to be noted that by use of different halogens one obtains new compounds technically not available up to today.

The herein claimed symmetrical and especially unsymmetrical urea, -thio urea- and urethane-sulphonic acids are predominantly suitable for protecting wool, feathers, furs, hair, paper, textiles, leather, natural or artificial fibres, or articles containing these substances from moths and other textile destructive grubs.

The pronounced fastness to washing and fulling of the products claimed is particularly worth mentioning. By suitable substitution they are also suitable as disinfecting agents, as bactericides, fungicides and insecticides, as excellent mercury-free seed steeping materials, as valuable agents against blood parasites and also as agents for use in the textile industry.

The following examples illustrate the process, the parts being by weight, where nothing other is said.

*Example 1*

16 parts of 4-amino-4'-chloro-5'-methyl-1:1'-diphenylether-2-sulphonic acid are dissolved in 250 parts of water with the necessary quantity of 10% soda solution. To this solution are added 30 parts of crystalline sodium acetate, and phosgene is introduced at 40-50° C. until a sample no longer indicates free amine. The solution is then exactly neutralised by means of soda, the urea, a N:N'-4:4'-(3":3"'-dimethyl-4":4"'-dichlorodiphenylhydroxy) - 3 : 3' - disulphodiphenylurea, precipitates as a pasty mass, it is separated, dried, ground and obtained as a bright excellently water-soluble powder. The yield is quantitative.

Instead of the 4-amino-4'-chloro-5'-methyl-1:1'-diphenylether-2-sulphonic acid there may also be used 4 - amino - 4' - amyl - 6' - chloro - 1:1'-diphenylether-2-sulphonic acid, 4-amino-2':4':5' - trichloro - 1:1' - diphenylether - 2 - sulphonic acid, 2-amino-2':4':5'-trichloro-1:1'-diphenylether-4-sulphonic acid, 2-amino-5:4'-dichloro-1:1'-diphenylether-4-sulphonic acid, 2-amino-5:4'-dichloro-5'-methyl-1:1'- diphenylether-4-sulphonic acid, 4-amino-2'-chloro-1:1'-diphenylether-2-sulphonic acid, 4-amino-4':6'-dichloro-1:1'-diphenylether-2-sulphonic acid, 2-amino-4':6'-dichloro - 1:1'- diphenylether-4-sulphonic acid, 4-amino-4'-chloro-1:1'-diphenylether-2-sulphonic acid, 2-amino-4'-chloro-1:1'-diphenylether-4-sulphonic acid, 2-amino-4'-chloro-5'-methyl-1:1'-diphenylether-4-sulphonic acid, 4 - amino - 4':5' - dichloro-1:1'-diphenylether-2-sulphonic acid, 4-amino-4'-chloro-3':5'-dimethyl-1:1'-diphenylether-2-sulphonic acid, 2 - amino - 4'- chloro - 3':5'- dimethyl - 1:1'- diphenylether - 4 - sulphonic acid, 4-amino-4'-chloro - 3'- methyl - 6'- isopropyl-1:1'-diphenylether-2-sulphonic acid, 2-amino-4'-chloro-3'-methyl-6'-isopropyl - 1:1'- diphenyl-ether-4-sulphonic acid, 2-amino-3':6'-dichloro-1:1'-diphenylether-4-sulphonic acid, 4-amino-3':6'-dichloro-1:1'-diphenylether-2-sulphonic acid, or 2-amino-4'-amyl-6'-chloro - 1:1'-diphenylether-4-sulphonic acid. These diphenylether sulphonic acids are obtained by known processes by condensation and subsequent reduction, from p-chloronitrobenzene sulphonic acid and/or o-chloronitrobenzene sulphonic acid with corresponding phenols.

*Example 2*

17.8 parts of 2-amino-4:4'-dichloro-1:1'-diphenylether-2'-sodium sulphonate, produced by mild sulphonation of 2-amino-4:4'-dichloro-1:1'-diphenylether are dissolved in 200 parts of water, 30 parts of crystalline sodium acetate are added and at 40-50° C. phosgene is introduced. The separated product is taken up in soda and thereupon salted out with saturated cooking salt solution, whereupon the urea alone precipitates in crystalline form. The yield in N:N'-2:2'-(4":4""- dichloro - 2":2"'- disulphodiphenoxy) - 5:5'-dichlorodiphenylurea is a theoretical one.

Instead of the above mentioned sulphonic acid it is possible to use other diphenylethersulphonic acids, namely those which are obtained by the after-sulphonation of unsulphonated diphenylethers, for example 4-amino-4'-chloro-1:1'-diphenylether - 2' - sulphonic acid, 4-amino-4'-chloro - 5'- methyl - 1:1'- diphenylether - 2'-sulphonic acid, 4 - amino - 2:4' - dichloro-1:1'di-phenylether-2'-sulphonic acid, 2-amino-4:4'-dichloro - 5' - methyl - 1:1'- diphenylether - 2'- sulphonic acid, 4-amino-2:4'-dichloro-5'-methyl-1:1'-diphenylether-2'-sulphonic acid, 2-amino-4:4':5' - trichloro - 1:1' - diphenylether - 2'- sulphonic acid, 4-amino-2:4':5'-trichloro-1:1'-diphenylether-2'-sulphonic acid, 2-amino-4:2'-dichloro-1:1'-diphenylether-4'-sulphonic acid, 4-amino - 4':6'-dichloro - 1:1'-diphenylether-2'-sulphonic acid, 2-amino-4:4':6'-trichloro-1:1'-diphenylether-2'-sulphonic acid, 2-amino-4':6'-dichloro-1:1'-diphenylether - 2'-sulphonic acid, 2 - amino - 4:4':5- trichloro - 5'- methyl-1:1'-diphenylether-2'-sulphonic acid, 2-amino-4:4':5-trichloro-1:1'-diphenylether-2'-sulphonic acid, 2-amino-4-chloro - 4'- amyl-1:1'-diphenylether-2'-sulphonic acid or 4-amino-2-chloro-4'-amyl-1:1'-diphenylether-2'-sulphonic acid.

*Example 3*

20 parts of 3-amino-4'-chloro-4-(4"-chloro-5"-methyl-2"-sulphophenoxy)-1:1' - diphenylsulphone, produced by condensation of 4-4'-dichloro-3-nitro - 1:1' - diphenylsulphone and 3-methyl-4-chlorophenol by means of potash lye at 120-150° C., reduction and sulphonation of the condensation product at 95° C. with sulphuric monohydrate for 3 hours, are dissolved in 250 parts of water by means of soda, 30 parts of sodium acetate are added and at 40-50° C. phosgene is introduced until amine can no longer be traced, eventually further acetate must be added. When acidifying, the urea sulphonic acid precipitates in the form of a paste. It is pressed and dried. The yield is quantitative.

It is also possible to use other phenoxydiphenylsulphone sulphonic acids as for example 3-amino-4'-chloro-2-(4"-chloro-3" - methyl - 2"-sulphophenoxy)-1:1' - dipenhyl - sulphone or 3-amino-4':5'-dichloro-4-(4"-chloro-3" - methyl-2"-sulphophenoxy)-1:1'-diphenylsulphone.

*Example 4*

17 parts of 2-amino-4'-chloro-1:1'-diphenylsulphide-4-sodium-sulphonate, obtained by condensation and subsequent reduction of 4-chlorothiophenol and o-chloro-nitrobenzene-sulphonic acid, are dissolved in 250 parts of water, 50 parts of crystalline sodium acetate are added thereto and phosgene is introduced at 40-50° C. until amine is no longer traceable. The separated pasty mass is drawn off, converted into the sodium salt and evaporated in vacuo. The urea forms a bright coloured powder, which dissolves clear in water. The yield is quantitative.

Instead of 2-amino-4'-chloro-1:1'-diphenylsulphide-4-sulphonic acid there may be used 4- amino-4'-chloro-1:1'-diphenylsulphide - 2 - sulphonic acid, 2-amino-4':5' - dichloro - 1:1' - diphenylsulphide-4-sulphonic acid, 4-amino-4':5'-dichloro-1:1'-diphenylsulphide-2-sulphonic acid, 4-amino-3':6'-dichloro-1:1' - diphenylsulphide-2-sulphonic acid, 2-amino - 3':6' - dichloro-1:1'-diphenysulphide-4-sulphonic acid, 4-amino-4'-bromo-1:1'-diphenylsulphide-2-sulphonic acid, 2-amino-4'-bromo-1:1'-diphenylsulphide - 4 - sulphonic acid, 4-amino-5'-chloro-6'-methyl-1:1'-diphenylsulphide-2-sulphonic acid, 4-amino-3'-chloro-6'-methoxy - 1:1' - diphenylsulphide - 2 - sulphonic acid, 4-amino-3':4':6'-trichloro-1:1'-diphenylsulphide-2 - sulphonic acid, 2 - amino-3':4':6'-trichloro-1:1'-diphenylsulphide - 4-sulphonic acid, 4 - amino - 2':4' - dichloro - 1:1'-diphenylsulphide-2-sulphonic acid, or 2-amino-3':4'-dichloro-1:1'-diphenylsulphide-4-sulphonic acid.

*Example 5*

10 parts of 4-amino-4'-chloro-1:1'-diphenylamine-2-sulphonic acid, produced by the known process from p-chlor-aniline and p-chloronitrobenzenesulphonic acid, are dissolved in 150 parts of water and the necessary quantity of soda, 25 parts of crystalline sodium acetate are added and phosgene is passed through at 30–40° C. until no more amine is present. The paste precipitated with acid is separated, converted with soda into the sodium salt and salted out with cooking salt. The product, a grey powder, dried in vacuo, is clearly soluble in water. The yield is excellent.

Instead of the above diphenylaminesulphonic acid there may also be used another one as for example 4-amino-3':4'-dichloro-1:1'-diphenylamine-2-sulphonic acid or 4-amino-4':6'-dichloro-1:1'-diphenylamine-2-sulphonic acid.

*Example 6*

20 parts of 4-amino-4'-chloro-1:1'-diphenylsulphone-2-sulphonic acid are dissolved in 250 parts of water with the necessary quantity of soda, 30 parts of sodium acetate are added thereto and phosgene is passed therethrough at 40–50° C. When amino is no longer traceable the precipitated sulphonic acid is converted into the sodium salt and this is dried under reduced pressure. The yield is quantitative.

Instead of 4-amino-4-chloro-1:1'-diphenylsulphone-2-sulphonic acid there may be used 2-amino-4'-chloro-1:1'-diphenylsulphone - 4 - sulphonic acid, 4-amino-3':4' - dichloro - 1:1' - diphenylsulphone-2-sulphonic acid or 2-amino-3':4'-dichloro-1:1' - diphenylsulphone - 4 - sulphonic acid.

*Example 7*

103 parts by weight of nitro-p-chlorobenzylchloride, boiling point 11 mm. 160–170° C. produced by nitrating p-chlorobenzylchloride, are stirred with 300 parts by volume of chlorobenzene and 100 parts of aluminium chloride at 25° C. until hydrochloric acid ceases to be formed. The excess chlorobenzene, after decomposition of the aluminium chloride with ice is driven off with steam, the residue is ethered out, dried and distilled under reduced pressure. The condensation product, probably 2-nitro-4:4'-dichloro-1:1'-diphenylmethane boils at boiling point 15 mm. 220–230° C.

By reduction with iron there is obtained the 2-amino-4:4' - dichloro - 1:1' - diphenylmethane, boiling point 15 mm. 220–230° C.

55 parts of this base are introduced into 500 parts of sulphuric acid monohydrate and stirred at 90–100° C. for 2 hours; then it is cooled, poured on to ice, sucked off, washed with water and dried. The 2-amino-4:4'-dichloro-1:1'-diphenylmethane-2'-sulphonic acid forms a white powder of very sweet taste. 10 parts of this diphenylmethane sulphonic acid are dissolved in 150 parts of water by means of soda, treated with the necessary quantity of crystalline sodium acetate and phosgene is introduced at 30–40° C. until the azo reaction has disappeared. The diphenylmethane urea is treated as in Example 1. After drying under reduced pressure it forms a bright powder which dissolves clear in water.

*Example 8*

22 parts of 4-amino-4'-chloro-1:1'-diphenylether and 19 parts of 3:4-dichlorophenylisocyanate boiling point 18 mm. 118–120° C., melting point 45–46° C., produced from 3:4-dichloraniline and phosgene according to a known process, are thoroughly intermixed and heated to 120° C. At this temperature the reaction takes place and the temperature increases automatically to 145° C. Then it is heated for a further 3 hours up to 160–170° C. and then allowed to cool. There are obtained 39 parts of an unsymmetrical urea derivative. 39 parts of this N'-(4''-chlorophenoxy)-phenyl-N'-3:4-dichlorophenyl urea are introduced into 200 parts by weight of sulphuric acid monohydrate at 10° C. The mixture is then cooled to −10 to −5° C. and at this temperature there are dropped in 35 parts by weight of 25% oleum and stirring takes place at this temperature until a sample is soluble in diluted alkali. It is then poured on ice, the acid is neutralised and salting out is effected. Yield 41 parts of a clear water-soluble product. Probably there has been formed the N'-4'-(2''-sulpho-4''-chlorophenoxy)-phenyl-N'-3:4-dichlorophenyl urea.

*Example 9*

44 parts of 4-amino-4'-chloro-1:1'-diphenylether are treated with 50 parts by volume of alcohol, 50 parts by volume of carbon disulphide and 0.3 part by weight of sulphur and heated to boiling for 6 hours in the reflux cooler; streams of sulphuretted hydrogen escape. The resulting N,N'-4:4'-(4''':4''''-dichlorodiphenoxy) - diphenylthio urea is sucked off and washed with a little alcohol. It forms silvery sparkling scales with a melting point of 192° C.

43 parts of N:N'-4:4-(4''':4''''-dichlorodiphenoxy)-diphenylthio urea are introduced into 200 parts of sulphuric acid monohydrate at about 10° C. and slowly heated to 20° C. until a sample becomes clearly water-soluble. The sulphonating mass is poured on to ice and salted out. The N:N'-4:4'-(2'':2''''-disulpho - 4''':4''''- dichlorodiphenoxy)-diphenylthio urea then separates.

*Example 10*

16.5 parts of the 2-amino-4:4'-dichloro-1:1'-diphenylmethane-2'-sulphonic acid, described in Example 7, are dissolved in 100 parts by volume of dry pyridine, and into the solution there are introduced at 10–15° C., whilst thoroughly stirring, 10 parts of 3:4-dichlorophenylisocyanate in small portions. After 1 hour the azo reaction has disappeared, the reaction mixture is then treated with steam until no further pyridine passes over. The residue is received in one litre of water and filtered hot. From the hot filtrate there separates on cooling the N-2'-(4''-chloro-2''-sulphobenzyl)-5'-chlorophenyl - N'- 3:4 - dichlorophenyl urea, in white flakes. They are sucked off, washed with a little water and dried in vacuo. The yield is quantitative.

Instead of 3:4-dichlorophenylisocyanate there may be used 4-chlorophenylisocyanate, 3-chlorophenylisocyanate, 2-chlorophenylisocyanate, 4-nitrophenylisocyanate, 2:4-dichlorophenylisocyanate, 2:5 dichlorophenylisocyanate, 2:4:5-trichlorophenylisocyanate, 3:4:5 - trichlorophenyl - isocyanate.

*Example 11*

23 parts of 4-amino-4'-chloro-1:1'-diphenylether-2'-sodium sulphonate (70%) are suspended in 100 parts by volume of dry pyridine and there are added thereto at 20° C., whilst thoroughly stirring, 10 parts of phenyl oil of mustard. The temperature rises slowly automatically up to 35° C., whereby the sulphonic acid passes slowly into solution. After 1 hour no further amine is traceable, the solution is then treated with some sodium bicarbonate and the pyridine is driven off with steam. After an addition of 250 parts of hot water it is again boiled and then filtered hot. From the clear filtrate there is precipitated by means of a cooking salt solution, the condensation product, a N-4'-(4''-chloro-2''-sulphophenoxy)-phenyl-N'-phenylthio urea, as a thick resin. It is dried in vacuo and then forms a brittle easily water-soluble mass.

Instead of the 4-amino-4'-chloro-1:1'-diphenylether-2'-sulphonic acid, a sulphonic acid (as enumerated in Example 1) may be used. In addition to phenyl oil of mustard there may also be used allyl oil of mustard, benzyl oil of mustard, 4-chlorobenzyl oil of mustard, 3:4 dichlorobenzyl oil of mustard, 2-chlorobenzyl oil of mustard, 3-chlorophenyl oil of mustard.

*Example 12*

15 parts of 4-amino-4'-chloro-1:1'-diphenylether-2'-sodium sulphonate are suspended in 150 parts by volume of acetone and there are then added 3 parts of carbon disulphide. At 10–15° C. there are added in drops, whilst thoroughly stirring 50 parts by weight of hydrogen peroxide (3%). Stirring then takes place for 3 hours at 15–20° C.; should the azo reaction after this period of time be not yet negative, treatment is again carried out with 3 parts by weight of carbon disulphide and thereupon with 50 parts by weight of hydrogen peroxide and further stirring for 1 hour at 15–20° C. It is now poured into a concentrated cooking salt solution, the separated resin is removed and distilled with water vapour. The distillation residue is freed from any sulphur and the clear filtrate is treated with brine, whilst the condensation product separates as a rudy-grey resin. It is separated and dried in vacuo, whereby it solidifies to a brittle grey mass which by rubbing is converted into a bright powder. The product is clearly water-soluble.

Instead of the 4-amino-4'-chloro-1:1'-diphenylether-2'-sulphonic acid other sulphonic acids of the diphenylether series may be used, those for example mentioned in Examples 1 and 2.

*Example 13*

9 parts by weight of 2-amino-4:4'-dichloro-1:1'-diphenyl-ether-2'-sulphonic acid are dissolved in 50 parts by volume of dry pyridine. The solution whilst thoroughly stirring is treated at 10–15° C. in small portions with 10 parts of 3:4-dichlorophenyl carbamic acid chloride and after all the carbamic acid chloride has been introduced it is heated for a further hour at 40–50° C. Then it is treated with 100 parts by volume of 10% soda solution and the mixture is treated with steam until all the pyridine has passed over. The residue is cooled, the separated resin removed and received in 500 parts of hot water, filtered hot, and from the filtrate there is precipitated with a little brine the N-2'-(4''-chloro - 2'' - sulpho-phenoxy)-5'-chloro-N'-3:4-dichlorophenyl urea, as a thick bright resin. It is separated from the aqueous layer and dried in vacuo, whereby the product is obtained as a bright brittle mass. The yield is quantitative.

Instead of 2-amino-4:4'-dichloro-1:1'-diphenylether-2'-sulphonic acid other sulphonic acids of the diphenylether series may be used, for example 4-amino-4'-chloro - 5' - methyl - 1:1'-diphenylether-2-sulphonic acid, 4-amino-4'-amyl-6'-chloro-1:1'-diphenylether-2-sulphonic acid, 4-amino-2:4':5'-trichloro - 1:1'-diphenylether-2'-sulphonic acid, 4-amino-4':6'-dichloro-1:1'-diphenylether-2-sulphonic acid, 2-amino-4':6'-dichloro-1:1'-diphenylether - 4 - sulphonic acid, 4-amino-4':5'-dichloro - 1.1'-diphenylether-2-sulphonic acid. The aminodiphenylsulphides such as the 4-amino-4':5'-dichloro-1:1'-diphenylsulphide-2-sulphonic acid condense quantitatively with 3:4-dichlorophenyl carbamic acid chloride. Instead of the 3:4-dichlorophenyl carbamic acid chloride the equivalent quantity of 3:4-dichlorophenylisocyanate can be treated with the enumerated amino-sulphonic acids.

*Example 14*

12 parts of 1-amino-3:4-dichlorobenzene-6-sulphonic acid are dissolved in 75 parts by volume of dry pyridine. Then whilst stirring there are introduced at 10–15° C. in small portions, 15 parts of 3:4-dichlorophenyl carbamic acid chloride and the whole is stirred for 1 hour at 40–50° C. When no further free amine is traceable, the reaction mixture is treated with soda solution and the reaction mixture is then treated with steam until no further pyridine passes over. The residue is boiled with water, filtered and treated with a little cooking salt solution. The condensation product, the N-3:4-dichloro-6-sulphophenyl-N'-3':4'-dichlorophenyl urea is obtained in beautiful laminae which after washing and drying in vacuo give the following analysis:

Found Cl:31.67% S:7.06% Yield very good.
Calculated Cl:31.5% S:7.08%

Instead of the 1-amino-3:4-dichlorobenzene-6-sulphonic acid another halogenated aniline sulphonic acid may be used, for example 4-chloroanilinesulphonic acid or 2:4-dichloraniline-5-sulphonic acid.

*Example 15*

10 parts of metanilic acid are dissolved in 75 parts by volume of dry pyridine and the solution is treated slowly at 5–10° C. whilst thoroughly stirring with the equivalent quantity of 3-chloro-6-(4'-chlorophenoxy)-phenyl carbamic acid chloride, produced from 2-amino-4:4'-dichloro-1:1'-diphenylether and phosgene according to known processes. It is then further stirred for 1 hour at 40–50° C., then treated with soda and the pyridine removed as in Example 1. The residue is received in hot water, filtered and the clear filtrate is treated with a little cooking salt solution. There thus separates the N-3'-chloro-6'-(4''-chloro - phenoxy)-phenyl-N'-3 - sulphophenyl urea. It is separated, dried in vacuo and then forms a bright rose coloured powder which dissolves well in water.

Example 16

44 parts of 4-amino-4'-chloro-1:1'-diphenyl-ether are intimately mixed with 7 parts of urea and slowly heated to 160–170° C. until no further ammonia escapes, which occurs as a rule after 3 hours. The yield in N,N'-4:4'-(4'':4'''-dichloro-diphenoxy)-diphenyl urea amounts to 46 parts.

The above urea is introduced at 10° C. into 200 parts of sulphuric acid monohydrate, then cooled to −10° C. and 65 parts of 26% oleum are added in drops. After half an hour a sample is easily soluble in water; the reaction mixture is poured on to ice and salted out. After drying in vacuo 48 parts of a water-soluble disulphonic acid are obtained.

Example 17

1/20 mol. of m-aminobenzoyl-3:4-dichloranilide-6-sulphonic acid are dissolved in 100 parts by volume of dry pyridine, and the solution, whilst stirring and cooling, is treated slowly at 10–15° C. with 10 parts of 3:4-dichlorophenyl carbamic acid chloride. After introducing the latter the whole is stirred for another 1½ hours until the azo reaction disappears. Then it is treated with some soda and the pyridine is blown off with steam. The residue is introduced into 1 litre of hot water, rapidly boiled, filtered hot and the filtrate is treated with brine. The condensation product is precipitated as a grey resin; it is separated and dried in vacuo.

m-Aminobenzoyl-3:4-dichloranilide-6-sulphonic acid is obtained by conversion of 3-nitrobenzoylchloride with 1-amino-3:4-dichloro-benzene-6-sulphonic acid in pyridine. The nitrobody is reduced with iron according to known processes and is precipitated from the soda-alkaline filtrate obtained by means of hydrochloric acid.

Example 18

1/20 mol. of 4-amino-4'-alkyl-1:1'-diphenylether-2-sulphonic acid is dissolved in 200 parts by volume of dried pyridine or acetone and, whilst stirring, is treated at 10–15° C., in portions, with 10 parts of 3:4-dichlorophenylisocyanic acid ester, then further stirred at room temperature until the azo reaction has disappeared. After the addition of 50 parts of 10% soda solution, the pyridine or acetone is blown off with steam, the residue boiled with 2 litres of water whilst introducing steam, filtered hot and the condensation product is precipitated from the filtrate as a thick resin by means of brine. It is separated and dried in vacuo. The N:4'-(4''-amylphenoxy)-5-sulphophenyl-N'-3:4-dichlorophenyl urea is readily soluble in hot water.

Example 19

18 parts of 2-amino-4:4'-dichloro-1:1'-diphenylether-2'-sulphonic acid (1/20 mol.) are dissolved in 100 parts by volume of dry pyridine and treated at 5–10° C., whilst stirring, with 20 parts of 2:5-dichlorophenyl carbamic acid chloride. After the first reaction further stirring takes place at 40–50° C. and then the treatment is carried out (as indicated in Example 1). The N-2'-(4''-chloro-2''-sulphophenoxy)-5'-chlorophenyl-N'-2:5-dichlorophenyl urea is readily soluble in hot water.

Instead of the 2:5-dichlorophenyl carbamic acid chloride there may be used the diphenyl carbamic acid chloride or the N'-laurylphenyl carbamic acid chloride.

Example 20

10 parts of 4-amino-4'-chloro-1:1'-diphenyl-ether-2-sulphonic acid are dissolved by means of soda in 150 parts of water and treated in the presence of acetate with a slight excess of thiophosgene. The temperature is here maintained at 40–50° C., whereby the azo reaction should disappear slowly, otherwise there is added further acetate and a little thiophosgene. Then it is cooled, acidified with dilute hydrochloric acid and the thio-urea isolated. It is again received in soda and precipitated with brine, filtered and dried in vacuo.

Example 21

18 parts of 2-amino-4:4'-dichloro-1:1'-diphenylether-2'-sodium sulphonate are dissolved in 200 parts of water and at room temperature there are added in drops 11 parts of 4-chlorophenol carbonic acid chloride, produced according to German Patent 516,285; the resulting hydrochloric acid is neutralised by means of soda. The urethane-sulphonic acid precipitates in the form of a paste, is separated and dried in vacuo and then forms a powder which is fairly difficult to dissolve in water.

It is also possible to use other phenyl- or alkyl-chloro-carbonic acid esters.

Example 22

Phosgene is passed according to the above examples through 3'-methyl-4-aminodiphenyl-ether-2-sulphonic acid to produce symmetrical urea. The new compound is obtained as oily liquid, which is easily soluble in water, from which solution it can again be separated by addition of hydrochloric acid. The new compound is insoluble in chloroform and carbon tetrachloride, but soluble in glacial acetic acid.

12 parts of this urea derivative are dissolved in 50 parts by volume of glacial acetic acid and chlorine is passed therethrough for about 1 hour up to saturation. The chlorination product is precipitated by means of water containing hydrochloric acid, in form of yellow, semi-solid mass soluble in water. Content of chlorine: 20.2% or about 4 atoms per molecule.

Example 23

12 parts of the urea derivative according to the preceding example are dissolved with the calculated quantity of soda in 100 parts of water and chlorine is introduced thereinto at 30–40° C., whereby the reaction is maintained alkaline by a drop-by-drop addition of caustic soda lye. After 2 hours, the chlorinated product is precipitated by means of hydrochloric acid and obtained as friable brownish mass which contains 34.6% of bound chlorine. This content lies in the neighbourhood of the theoretical value for 8 atoms of chlorine per molecule (33.1%).

Similar halogen substitution products are obtained if the chlorination, for example in glacial acetic acid, is interrupted after some time and the halogenation is continued with a calculated quantity of bromine.

Instead of the aforesaid urea derivative, the other acylaminosulphonic acids enumerated in great number in the specification and the examples and their halogen-poorer or halogen-free parent bodies may be used.

Example 24

1/10 mol. of 4:4'-dichloro-2-amino-1:1'-diphenylether-2'-sulphonic acid are dissolved in 100 parts by volume of water-free pyridine and the solution is introduced while stirring and cooling at 10–15° C. in small portions into 1/10 mol. of 3:4-dimethylphenylisocyanate, obtained in the manner above referred to from 3:4-dimethylaminobenzene and phosgene. Thereupon stirring is continued for one hour without cooling, then a little soda solution is added and the pyridine distilled off by means of steam. The distillation residue is filtered hot and the filtrate mixed with a solution of common salt, whereby the condensation product is precipitated as a thick grey resin. The mass is separated off from the aqueous solution and dried in vacuo. The new compound is obtained as a grey brittle mass which is easily soluble in water.

*Example 25*

102 parts of 5-chloro-2-hydroxydiphenyl are melted together with 86.5 parts of 2-chloronitrobenzene and mixed at 130–140° C. with 28 parts of potash lye dissolved in 30 parts of water. Then the whole is heated during 8 hours to 150–160° C., thereupon the reaction mass is poured into water, rendered alkaline and treated with steam. After cooling the nitro-body is filtered off, washed and reduced in acid solution with iron. From the residue of reduction the base is extracted by means of chlorobenzene and distilled in high vacuo. Boiling point at 0.2 mm. pressure: 185° C.

35 parts of this base are slowly introduced, while being cooled by ice and stirred, into 250 parts of sulphuric acid monohydrate, then stirred during 4 hours at 15–20° C. and finally the violet solution is poured onto ice. The separated sulphonic acid is sucked off, dissolved in dilute caustic soda lye, the solution is filtered and the filtrate acidulated with acetic acid. By addition of an equal volume of common salt solution, the sodium salt of the new sulphonic acid is precipitated out. The same is sucked off, washed with dilute brine and dried in vacuo.

18 parts of this compound are dissolved in 100 parts by volume of dry pyridine and this solution is mixed at 10–15° C. with 70 parts of a 15 per cent solution of 3:4-dichloro-phenylisocyanate in nitrobenzene. After stirring during 5 hours without cooling the solvents are distilled off by means of steam, the distillation residue is dissolved in hot water and the whole filtered off. From the filtrate the new condensation product separates out on cooling, it is sucked off, washed with some water and dried in vacuo.

Instead of the carbonic acid- or thiocarbonic acid derivatives mentioned in the above examples, there can obviously also be used the other compounds cited in the preamble or general part of this specification.

What we claim is:

1. The urea derivatives of the formula:

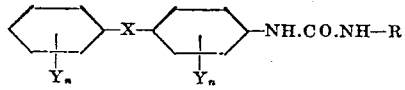

wherein X represents a linking member selected from the group consisting of O, S, and SO₂, Y represents a member of the group consisting of H, alkyl and halogen, n is one of the integers 1 and 2, and R represents a member of the group consisting of

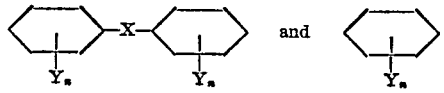

wherein Y, n and X have the above-defined meanings, there being at least one SO₃H group in at least one of the aforesaid benzene nuclei and at least one halogen atom in at least one of said nuclei, said derivatives being useful for durably protecting wool and other substances against moths and for disinfecting and like purposes.

2. The urea derivatives of the formula

wherein Z represents the radical of a halogen substituted diphenyl ether, and R represents a member of the group consisting of

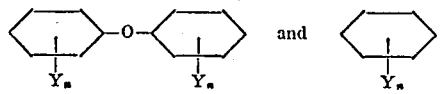

wherein Y represents a member of the group consisting of H, alkyl and halogen, and n is one of the integers 1 and 2, at least one of the benzene nuclei present containing an SO₃H group, said derivatives being useful for durably protecting wool and other substances against moths and for disinfecting and like purposes.

3. The urea derivatives of the following general formula

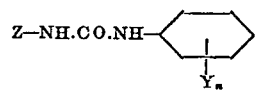

Wherein Z means the radical of a halogen substituted diphenyl ether, Y means substituents selected from the group consisting of H, alkyl and halogen and n is one of the integers 1 and 2, at least one of the benzene nuclei present containing one SO₃H group, these compounds being useful for durably protecting wool and other substances against moths and for disinfecting and like purposes.

4. The urea derivatives of the following general formula

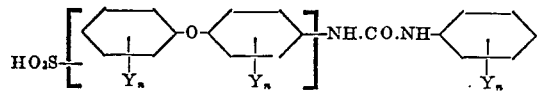

wherein Y means a substituent selected from the group consisting of H, alkyl and halogen, and n means one of the integers 1 and 2, these compounds being useful for durably protecting wool and other substances against moths and for disinfecting and like purposes.

5. The urea derivatives of the following general formula

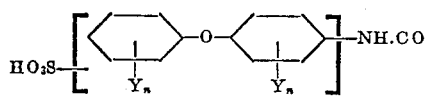

wherein Y means a substituent selected from the group consisting of H, alkyl and halogen, and n means one of the integers 1 and 2, these compounds being useful for durably protecting wool and other substances against moths and for disinfecting and like purposes.

6. The halogen substituted urea of the following formula

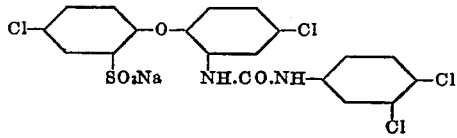

being particularly useful for durably protecting wool and other substances against moths.

7. The halogen substituted urea of the following formula

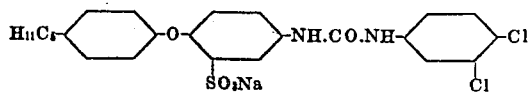

being particularly useful for durably protecting wool and other substances against moths.

8. The halogen substituted urea of the following formula

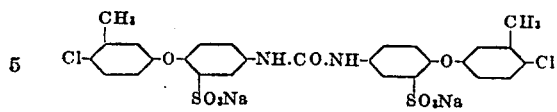

being particularly useful for durably protecting wool and other substances against moths.

HENRY MARTIN.
HANS HEINRICH ZAESLIN.
RUDOLF HIRT.
CURT GLATTHAAR.
ALFRED STAUB.

Certificate of Correction

Patent No. 2,311,062. February 16, 1943.

HENRY MARTIN ET AL.

It is hereby certified that error appears in the printed specification of the above numbered patent requiring correction as follows: Column 7, lines 57 to 60, inclusive, claim 5, for that portion of the formula reading and that the said Letters Patent should be read with this correction therein that the same may conform to the record of the case in the Patent Office.

Signed and sealed this 26th day of October, A. D. 1948.

[SEAL]

THOMAS F. MURPHY,
*Assistant Commissioner of Patents.*